United States Patent [19]

Walther

[11] 4,116,489
[45] Sep. 26, 1978

[54] LOCK RING FLANGED TIRE CARRYING RIM AND WHEEL

[75] Inventor: William D. Walther, Kettering, Ohio

[73] Assignee: Dayton-Walther Corporation, Dayton, Ohio

[21] Appl. No.: 749,242

[22] Filed: Dec. 13, 1976

Related U.S. Application Data

[63] Continuation-in-part of Ser. No. 592,503, Jul. 9, 1975, abandoned.

[51] Int. Cl.$^2$ ............................................. B60B 23/10
[52] U.S. Cl. ............................ 301/12 R; 301/13 SM; 301/19; 301/35 SL; 152/410
[58] Field of Search ............. 301/10 R, 11 R, 11 CD, 301/12 R, 13 R, 13 SM, 19–20, 22, 35 SS, 35 SL, 90–97; 152/396–398, 406–410

[56] References Cited

U.S. PATENT DOCUMENTS

| | | | |
|---|---|---|---|
| 1,617,999 | 2/1927 | Forsyth | 152/407 X |
| 2,010,238 | 8/1935 | Keller | 301/12 R |
| 2,270,918 | 1/1942 | Ash | 301/13 R |
| 2,427,634 | 9/1947 | Temple | 152/409 |
| 2,623,792 | 12/1952 | Mills | 301/13 SM |
| 2,767,026 | 10/1956 | Walther Sr. | 301/13 SM |

FOREIGN PATENT DOCUMENTS 2,254,721  5/1973  Fed. Rep. of Germany ............. 301/97

*Primary Examiner*—Robert B. Reeves
*Assistant Examiner*—Charles A. Marmon
*Attorney, Agent, or Firm*—Mack D. Cook, II

[57] ABSTRACT

Tire carrying rims seated and locked on vehicle wheels by fastening assemblies. A wheel has spoke members with dimensioned felloe surfaces for mating engagement with coacting surfaces on the base edge portion of a rim having an annular lock ring formed integrally with mounting flanges having a radially inwardly projecting terminal portion. Rims may be dual mounted in mating, seating or full surface engagement with coacting felloe surfaces of the rim and wheel by full tightening of the fastening assemblies.

3 Claims, 8 Drawing Figures

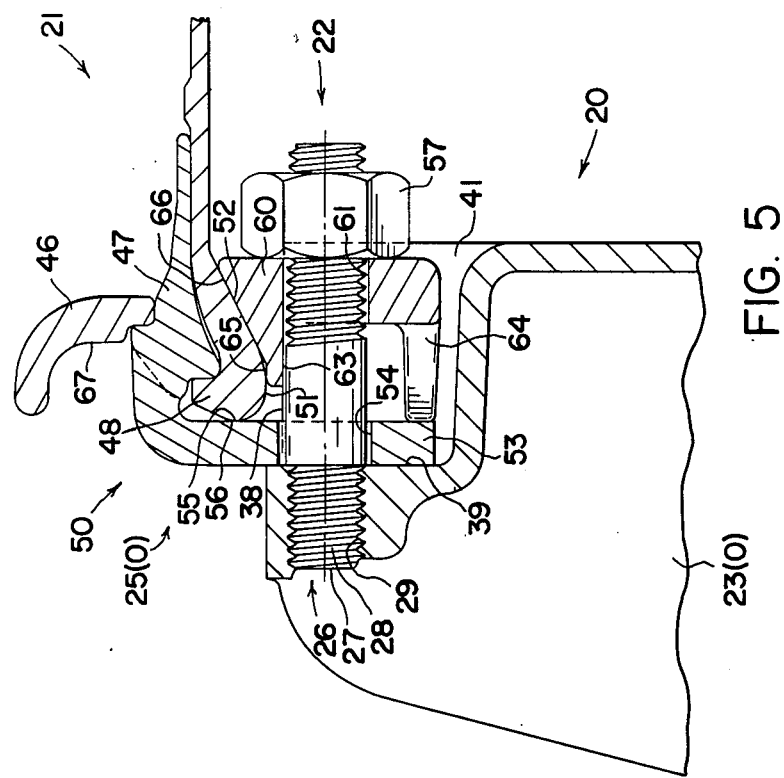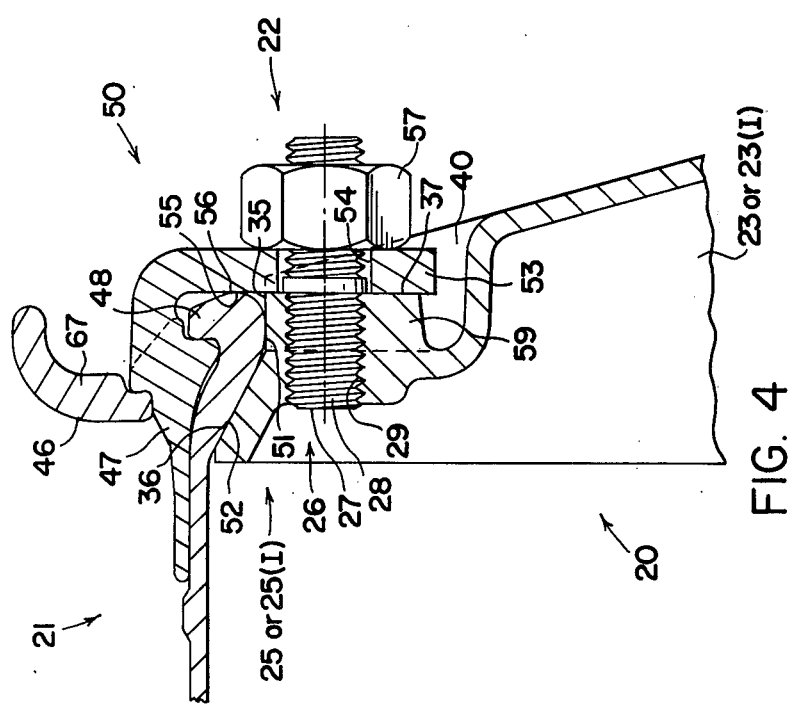

LOCK RING FLANGED TIRE CARRYING RIM AND WHEEL

BACKGROUND OF THE INVENTION

This application is a continuation-in-part of U.S. application Ser. No. 592,503, filed July 9, 1975, now abandoned.

The present invention relates to a combination of dual tire carrying rims seated and locked by fastening assemblies on a vehicle wheel. A combination of dual inner and outer tire carrying rims may be mounted on a vehicle wheel without using a separating means, such as an annular spacer.

The inner spoke members of a dual wheel have a felly, felloe or load-bearing portion with radially outer axially oriented and radially inclined surfaces. These felloes also have a radially directed surface extending inwardly from an axially oriented surface.

The outer spoke members of a dual wheel have a felly, felloe or load-bearing portion with radially outer dual axially oriented surfaces and a radially directed surface extending inwardly between the axially oriented surfaces.

In several embodiments, a rim, whether mounted as an inner dual or outer dual, may be of an identical and, therefore, interchangeable construction. The rims have a removable bead flange with a lock ring carried by a rim base edge portion having intersecting axially oriented and radially inclined surfaces. The lock ring has radially inwardly projecting mounting flanges, the terminal portion of each mounting flange being radially directed.

An initial tightening of the fastening assemblies for a dual wheel will seat the axially oriented and radially inclined rim surfaces in concentric radial registry with the radially outer surfaces on the spoke members. Thereafter, the seated rims will be locked on the spoke members, in axial and radial alignment and registry, by further tightening of the fastening assemblies against the terminal portion of each rim mounting flange and the full surface engagement thereof with a radially directed wheel felloe surface. The mounting flanges are proportioned or dimensioned such that during final tightening, a fastening assembly will elastically stress or minutely deform each mounting flange and the rim base edge portion relative to the plane of the radially directed wheel felloe surfaces to provide the full axial and radial alignment and registry of rim to wheel.

The prior art relating to tire carrying rims demountably carried on vehicle wheels includes patents to be found in Class 301 beginning with Subclass 10R. Other relevant patents may be found in Class 152, Subclasses 406X et seq.

The accurate mounting of tire carrying rims on the felloe, felly or load-bearing portion of a wheel has long been a problem in the art. Vehicle operators and industry regulations seek longer tire life and complete safety in operation, even under the most severe of vehicle operating conditions. The tire manufacturers are endeavoring to provide tires which have optimum performance characteristics, including lateral and radial balance. Consequently, it is being required that this art provide elements, the wheels, the rims, and fastening assemblies therefor, which do not deteriorate, hinder or impair the projected performance characteristics of the tires.

Heretofore, the spoked wheel structure of a tire-rim-wheel assembly has been regarded primarily as a load carrying element attached to an axle of the vehicle and carrying the rim. The periphery of the wheel had felly surfaces to pilot or guide the rim into approximate mounting position. Thereafter, fastening assemblies were torqued down or tightened in such a manner that the tire carrying rim would not come loose from the wheel during use. If done correctly, as by an expert and conscientious mechanic, the prior art rim mounting techniques would not deteriorate, hinder or impair the performance characteristics of the tires. However, environmental or extrinsic factors such as warpage, deformation or damage to the rim and spacer or wear of the fastening assemblies could lead to relative displacement or non-alignment of the assembly components during fastening, creating conditions of what are now commonly referred to as excessive lateral (axial) or radial runout, or an imbalance of the tire-rim-wheel assembly during vehicle operation.

The concepts of the invention provide wheel spoke members with proportioned or dimensioned felloe surfaces for mating, seating or full surface engagement with coacting surfaces on the rim base edge portion and terminal portion of the lock ring mounting flanges by full tightening of the fastening assemblies.

A rim with a removable bead flange having an annular lock ring and fastening assemblies therefor according to the invention, when used with wheels adapted thereto, positively controls and reduces lateral (axial) and radial runout, resists rim warpage or deformation, restricts rim rotation relative to the wheel, prevents dislodgement of the lock ring from the rim base during vehicle operation and provides better balance for the tire-rim-wheel assembly during vehicle operation.

SUMMARY OF THE INVENTION

The object of the invention is to provide an improved combination of dual inner and outer tire carrying rims seated and locked by fastening assemblies on a vehicle wheel.

It is a further object of the invention to provide rims with a removable bead flange and surfaces on the rim base edge portion and lock ring mounting flanges with radially directed terminal portions which are mounted on the spoke members of a wheel having coacting felloe surfaces by the full tightening of fastening assemblies.

It is a further object of the invention to provide a combination of dual tire carrying rims seated and locked by fastening assemblies on a vehicle wheel which positively controls and reduces lateral (axial) and radial runout, resists rim warpage or deformation, restricts rim rotation relative to the wheel, prevents dislodgement of the lock ring from the rim base during vehicle operation and provides better balance for the tire-rim-wheel assembly during operation.

These and other objects of the invention, as well as the advantages thereof, will be apparent in view of the detailed description of the various embodiments thereof as set forth below.

In general, an improved dual wheel according to the invention has a plurality of inner and outer spoke members. Each of the inner spoke members has a felloe comprising radially outer axially oriented and radially inclined surfaces and a radially directed surface extending inwardly from an axially oriented surface substantially perpendicular to the rotational axis of said wheel and providing a mounting location for an axially projecting component of a fastening assembly. Each of the outer spoke members has a felloe comprising radially outer spaced-apart axially projecting wing portions providing outwardly facing dual axially oriented surfaces and a radially directed surface oriented transversely between the axially oriented surfaces substantially perpendicular to the rotational axis of the wheel and providing a mounting location for an axially projecting component of a fastening assembly.

In general, a tire carrying rim has a removable bead flange with a lock ring carried by a rim base edge portion having radially inwardly facing axially oriented and radially inclined surfaces for registry with the radially outer felloe surfaces of the wheel spoke members. The lock ring has radially inwardly projecting mounting flanges, the terminal portion of each flange being radially directed and having a bore therein for receiving the axially projected component of a fastening assembly. The mounting flanges are proportioned or dimensioned such that during final tightening of a fastening assembly, each mounting flange and the rim base edge portion will be placed under load and thereby elastically stressed or minutely deformed relative to the plane of a radially directed wheel felloe surface in full surface engagement with the terminal portion of each mounting flange.

In general, each fastening assembly for mounting an inner dual rim will comprise a threaded fastener having a rotatable element for bearing engagement against the terminal portion of each lock ring mounting flange.

In general, each fastening assembly for mounting an outer dual rim will have a threaded fastener and a clamp element supported thereon. Each clamp element will have lateral wing portions for mating engagement with the outwardly facing felloe surfaces, an axially inwardly directed member for mating engagement with the terminal portion of each lock ring mounting flange, and a radially outer portion with a radially inclined surface for mating engagement with a radially inclined surface on the rim base edge portion.

According to the invention, an inner dual tire carrying rim is seated on, and thereafter locked on, a wheel by initial and final tightening of fastening assemblies against each rim mounting flange terminal portion. During initial tightening of the fastening assemblies, the radially inwardly facing rim surfaces will seat in concentric radial registry with the radially outer wheel felloe surfaces. Final tightening of the fastening assemblies to apply a compression load will lock the rim on the wheel, in axial and radial alignment and registry relative to the rotational axis of rim and wheel, by the full surface engagement of the mounting flange terminal portions with the radially directed wheel felloe surfaces and the elastic deformation of the mounting flanges and the rim base edge portion relative to the substantially perpendicular plane of the radially directed wheel felloe surfaces.

According to the invention, an outer dual tire carrying rim is seated on, and thereafter locked on, a wheel by initial and final tightening of fastening assemblies against each rim mounting flange terminal portion. During initial tightening of the fastening assemblies, the radially inclined rim surface will seat in concentric radial registry with the radially inclined surfaces on the radially outer clamp element portions, the downwardly facing dual axially oriented surfaces on the lateral wing clamp element portions being in mating engagement with the outwardly facing dual axially oriented wheel felloe surfaces. Final tightening of the fastening assemblies to apply a tension load will lock the rim on the wheel, in axial and radial alignment and registry relative to the rotational axis of rim and wheel, by the mating engagement of the axially inwardly directed member on each clamp element with the mounting flange terminal portions and the full surface engagement of the mounting flange terminal portions with the radially directed wheel felloe surfaces and the elastic deformation of the mounting flanges and the rim base edge portion relative to the substantially perpendicular plane of the radially directed wheel felloe surfaces.

DESCRIPTION OF THE DRAWINGS

FIG. 4 is a sectional view of a combination of the tire carrying rim of FIG. 3 seated and locked by a fastening assembly on yet another form of wheel felloe according to the invention;

FIG. 5 is a sectional view of a combination of the tire carrying rim of FIGS. 3 and 4 seated and locked by a fastening assembly on still another form of wheel felloe according to the invention;

DETAILED DESCRIPTION OF THE INVENTION

Figure 1:
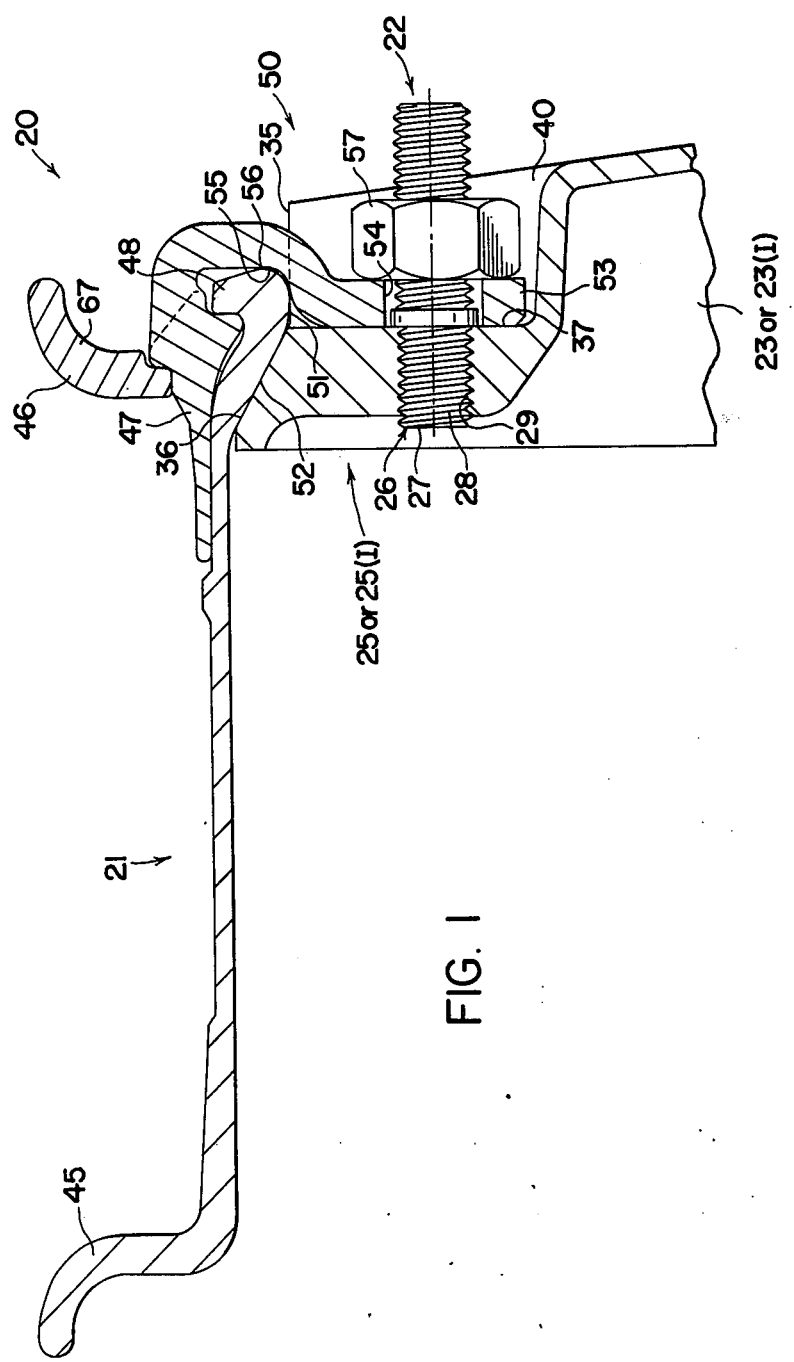
FIG. 1 is a sectional view of a combination of a tire carrying rim seated and locked by a fastening assembly on a wheel felloe according to the invention.

A wheel for use with a tire carrying rim according to the invention is referred to generally by the numeral 20. A tire carrying rim according to the invention is referred to generally by the numeral 21. The fastening assemblies which are tightened for seating and locking of a rim 21 are referred to generally by the numeral 22.

In general, a wheel 20 for mounting a tire carrying rim 21 has a plurality of spaced-apart spoke members 23 extending radially from a conventional hub area (not shown) adapted for attachment of the wheel to a vehicle axle (not shown). On a wheel 20 for mounting dual inner and outer rims 21, the inner spoke members are indicated by 23(I) and the outer spoke members by 23(O).

Each spoke member 23 terminates in a felloe, felly or load-bearing portion referred to generally by the numeral 25. On a wheel 20 for mounting dual rims 21, the inner felloes are indicated by 25(I) and the outer felloes by 25(O).

Each wheel felloe 25 has a predetermined mounting location indicated generally at 26 for the axially projecting component of a fastening assembly 22. As shown, the axially projecting component of a fastening assembly 22 attached to the felloe portion 25 at a mounting location 26 is an elongated stud 27 having an inner end with peripheral threads 28 for mating engagement with bore threads 29. Alternatively, the studs 27 may be attached to the felloe portion 25 at a mounting location 26 as by a conventional arc stud or capacitor-discharge welds.

A wheel felloe portion 25 or 25(I) has an axially oriented surface 35 intersecting a radially inclined surface 36. A radially directed surface 37 extends inwardly away from a surface 35. Each surface 37 has a mounting location 26 for the axially projecting component of a fastening assembly 22 and is substantially perpendicular to the rotational axis of a wheel 20.

A dual wheel outer felloe portion 25(O) has axially oriented surfaces 38 intersecting a radially directed surface 39 oriented transversely between the surfaces 38. Each surface 39 has a mounting location 26 for the axially projecting component of a fastening assembly 22 and is substantially perpendicular to the rotational axis of a wheel 20.

Figure 2:
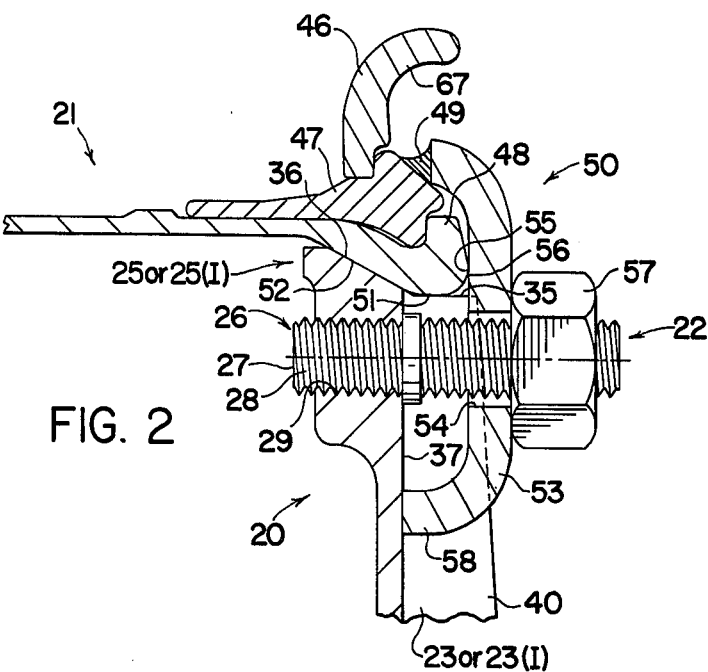
FIG. 2 is a sectional view of a combination of another form of tire carrying rim seated and locked by a fastening assembly on a wheel felloe according to the invention.
Figure 3:
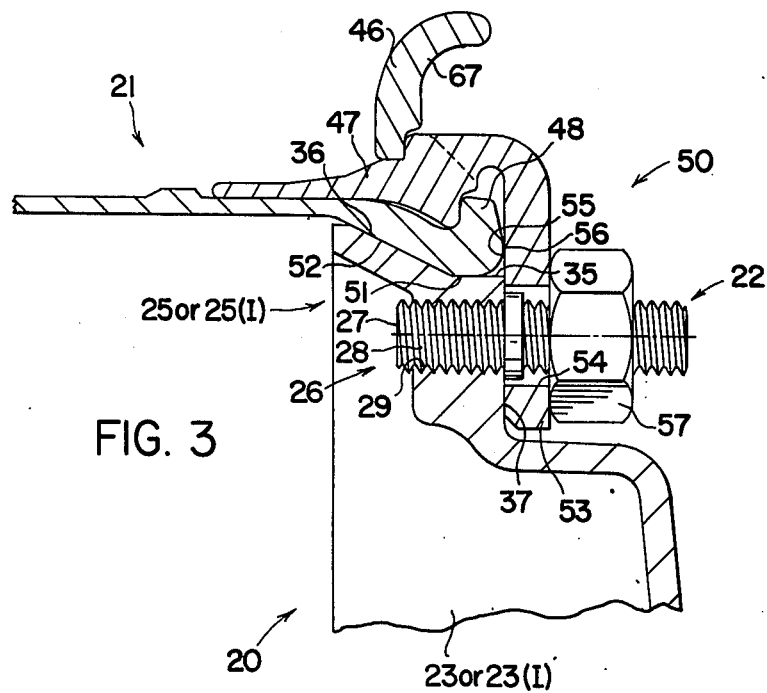
FIG. 3 is a sectional view of a combination of yet another form of tire carrying rim seated and locked by a fastening assembly on another form of wheel felloe according to the invention.

As shown in FIGS. 1, 2 and 4, a felloe portion 25 or 25(I) may have spaced-apart axially projecting wing portions 40 providing outwardly facing dual axially oriented surfaces 35. Alternatively, as shown in FIG. 3, a felloe portion 25 or 25(I) may have a single axially oriented surface 35 extending substantially the width of the felloe portion.

As shown in FIG. 5, a felloe portion 25(O) has spaced-apart axially projecting wing portions 41 providing outwardly facing dual axially oriented surfaces 38.

A tire carrying rim 21 has a fixed bead flange 45 and a removable bead flange 46 for seating the beads (not shown) of a tire in a conventional manner. The removable bead flange 46 has a transversely split lock ring 47 carried by an annular rim base edge portion 48. The lock ring 47 is formed integrally with or has attached thereto, as by a weld 49, a radially inwardly projecting flange referred to generally by the numeral 50.

The rim base edge portion 48 has an axially oriented surface 51 intersecting a radially inclined surface 52. As shown in FIGS. 1-4, the radially inwardly facing rim surfaces 51 and 52 may conform to and be seated on the radially outer surfaces 35 and 36 on a wheel felloe 25 or 25(I). Or, as shown in FIG. 5, and as described in further detail below, the rim surfaces 51 and 52 may conform to and be seated on radially outer surfaces on stud supported clamp elements of the fastening assemblies 22.

The terminal portion 53 of each rim flange 50 is radially directed substantially perpendicular to the rotational axis of a rim 21 and has a bore 54 for receiving the axially projecting component 27 of a fastening assembly 22.

A rim flange 50 also has a radially directed axially inwardly facing surface 55 located adjacent the axially outer facing surface 56 of the rim base edge portion 48. Preferably, the rim flange 50 is proportioned and dimensioned so that when a rim 21 is locked on the wheel 20 by a fastening assembly 22, the flange surface 55 will be in mating engagement with the rim base surface 56.

A rim mounting flange 50 may have varied configurations. As shown in FIG. 1, the rim flange in cross section generally has the shape of a question mark with the terminal portion 53 being oriented adjacent the wheel felloe surface 37 prior to engagement by a rotatable nut 57 carried on the elongated stud 27 of a fastening assembly 22 and subsequent full surface engagement against the felloe surface 37 during tightening of the nut 57.

As shown in FIG. 2, a rim flange 50 in cross section generally has the shape of an elongated C with the terminal portion 53 having an axially oriented end 58 directed toward the wheel felloe surface 37 for full surface engagement against the felloe surface 37.

The rim flanges 50 in cross section may also generally have the shape of an inverted L. This configuration is particularly suited for use on a wheel 20 having a felloe portion 25 or 25(I) with the axially oriented surface 35 extending substantially the width of the felloe portion, as shown in FIG. 3; or, for use on a wheel 20 having spaced-apart axially projecting wing portions 40 providing for dual axially oriented surfaces 35 on a felloe portion 25 or 25(I), as shown in FIG. 4. In the embodiment of FIG. 4, the surface 37 on a felloe portion 25 or 25(I) is carried on an axially projecting boss 59. The terminal portion 53 of the rim flange 50 is in mating or full surface engagement with a radially directed surface 37 subsequent to full tightening of the fastening assembly 22.

Figure 7:
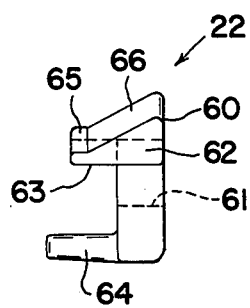
FIG. 7 is a detached view of a clamp element of a fastening assembly as used in FIG. 5; and, FIG. 8 is a plan view of the clamp element of FIG. 7.
Figure 8:
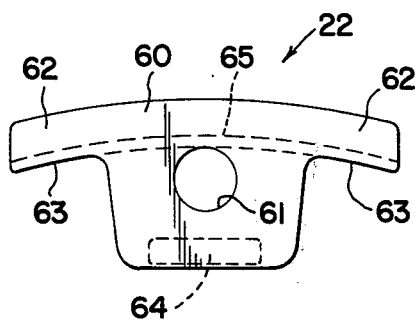

Referring to FIG. 5, a rim flange 50 having in cross section generally the shape of an inverted L is particularly suited for use on a wheel 20 having an outer spoke member 23(O). As shown, the terminal portion 53 of the flange 50 is locked against the surface 39 on a felloe portion 25(O) by a fastening assembly comprising an elongated stud 27, a clamp element 60 and a rotatable nut 57 threaded on the stud 27. Referring also to FIGS. 7 and 8, a clamp element 60 has a bore 61 for receiving the stud 27. A clamp element 60 also has lateral wing portions 62 providing downwardly facing dual axially oriented surfaces 63 for seating on conforming wheel felloe surfaces 38. A clamp element 60 also has an axially inwardly directed lower leg portion 64 for mating engagement against a flange terminal portion 53. The radially outer portion of a clamp element 60 has an axially oriented surface 65 intersecting a radially inclined surface 66 for mating engagement with conforming rim base edge portion surfaces 51 and 52.

Figure 6:
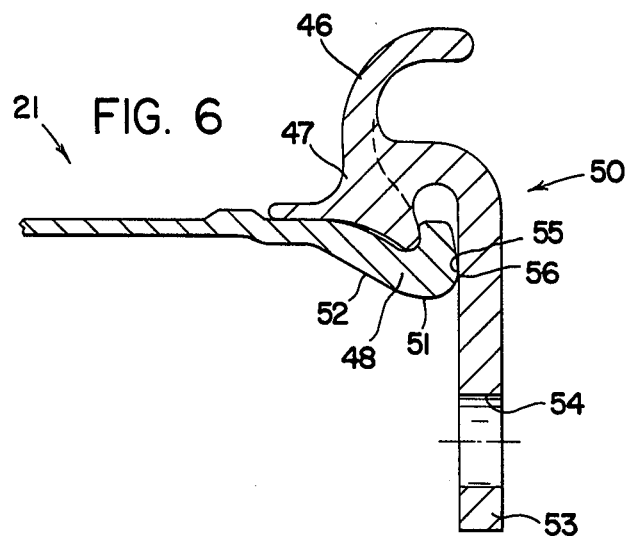
FIG. 6 is a sectional view of still another form of tire carrying rim according to the invention.

As shown in FIGS. 1-5, the rim lock ring 47 is formed separately from an annular side ring 67 which, when seated on the lock ring 47, comprises the removable bead flange 46. Referring to FIG. 6, the side ring 67 may be formed integrally with the lock ring 47 carrying a radially projecting mounting flange 50.

In all embodiments of the rim 21, as disclosed herein, an axially oriented surface 51 extends substantially parallel to the rotational axis of the rim and a radially inclined surface 52 extends outwardly away from a surface 51 at a suitable angle to provide a conical surface for mating engagement with either surface 36 on a wheel felloe portion 25 or 25(I) or surface 66 on the clamp elements 60.

What is claimed is:

1. A combination of dual inner and outer tire carrying rims seated and locked by fastening assemblies on a vehicle wheel, said wheel having a plurality of inner and outer spoke members, each of said inner spoke members having a felloe comprising axially oriented and radially inclined surfaces and a radially directed surface extending inwardly from each of said axially oriented surfaces substantially perpendicular to the rotational axis of said wheel and providing a mounting location for an axially projecting component of said inner rim fastening assemblies, each of said outer spoke members having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of said outer rim fastening assemblies, each of said rims having a removable bead flange with a lock ring carried by a rim base edge portion having radially inwardly facing axially oriented and radially inclined surfaces, said lock ring having radially inwardly projecting mounting flanges, the terminal portion of each said mounting flange being radially directed and having a bore therein for receiving said axially projecting component of each said inner rim and outer rim fastening assembly, each said fastening assembly for an outer rim comprising a threaded fastener and a clamp element supported by said threaded fastener, each said clamp element having lateral wing portions providing downwardly facing dual axially oriented surfaces, an axially inwardly directed member, and a radially outer portion with axially oriented and radially inclined surfaces, whereby, said inner rim is seated on, and thereafter locked on, said inner spoke members by tightening of said inner rim fastening assemblies and the mating engagement of said axially oriented and radially inclined surfaces on each said inner spoke felloe with said axially oriented and radially inclined surfaces on said inner rim base edge portion and by the mating engagement of said radially directed surface on each said inner spoke felloe with said terminal portion of each said inner rim mounting flange, and, whereby, said outer rim is seated on, and thereafter locked on, said outer spoke members by tightening of said outer rim fastening assemblies and the mating engagement of said radially directed surface on each said outer spoke felloe with said terminal portion of each said outer rim mounting flange and by the mating engagement of said axially oriented and radially inclined surfaces on each said outer rim base edge portion with said axially oriented and radially inclined surfaces on said radially outer portion of each said clamp element of each said outer rim fastening assembly, said downwardly facing dual axially oriented surfaces on said lateral wing portions of each said clamp element being in mating engagement with said outwardly facing dual axially oriented surfaces on each said outer spoke felloe and said axially inwardly directed member of each said clamp element being in mating engagement with said terminal portion of each said outer rim mounting flange.

2. A combination of dual inner and outer tire carrying rims mounted on a vehicle wheel, said outer rim being seated and locked on said wheel by fastening assemblies, said wheel having a plurality of inner and outer spoke members, each of said outer spoke members having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of said fastening assemblies, said outer rim having a removable bead flange with a lock ring carried by a rim base edge portion having radially inwardly facing axially oriented and radially inclined surfaces, said lock ring having radially inwardly projecting mounting flanges, the terminal portion of each said mounting flange being radially directed and having a bore therein for receiving said axially projecting component of said fastening assemblies, each said fastening assembly comprising a threaded fastener and a clamp element supported by said threaded fastener, each said clamp element having lateral wing portions providing downwardly facing dual axially oriented surfaces, an axially inwardly directed member, and a radially outer portion with axially oriented and radially inclined surfaces, whereby, said outer rim is seated on, and thereafter locked on, said outer spoke members by tightening of said fastening assemblies and the mating engagement of said radially directed surface on each said outer spoke felloe with said terminal portion of each said outer rim mounting flange and by the mating engagement of said axially oriented and radially inclined surfaces on each said outer rim base edge portion with said axially oriented and radially inclined surfaces on said radially outer portion of each said clamp element of each said fastening assembly, said downwardly facing dual axially oriented surfaces on said lateral wing portions of each said clamp element being in mating engagement with said outwardly facing dual axially oriented surfaces on each said outer spoke felloe and said axially inwardly directed member of each said clamp element being in mating engagement with said terminal portion of each said outer rim mounting flange.

3. A combination of dual inner and outer tire carrying rims mounted on a vehicle wheel, said outer rim being seated and locked on said wheel by fastening assemblies, said wheel having a plurality of inner and outer spoke members, each said outer spoke member having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of said fastening assemblies, said outer rim having a removable bead flange with a lock ring carried by a rim base edge portion with a radially inwardly facing radially inclined surface, said lock ring having radially inwardly projecting mounting flanges, the terminal portion of each said mounting flange being radially directed and having a bore therein for receiving said axially projecting component of said fastening assemblies, each said fastening assembly comprising a threaded fastener and a clamp element supported by said threaded fastener, each said clamp element having lateral wing portions providing downwardly facing dual axially oriented surfaces, an axially inwardly directed member, and a radially outer portion with a radially inclined surface, whereby, said rim is seated on, and thereafter locked on, said wheel by initial and final tightening of said fastening assemblies, said initial tightening seating said radially inclined surface on said rim base edge portion in registry with said radially inclined surfaces on said radially outer clamp element portions, said downwardly facing dual axially oriented surfaces on said lateral wing clamp element portions being in mating engagement with said outwardly facing dual axially oriented wheel felloe surfaces, said final tightening of said fastening assemblies locking said rim on said wheel by the mating engagement of said axially inwardly directed member on each said clamp element with said mounting flange terminal portions and the full surface engagement of said mounting flange terminal portions with said radially directed wheel felloe surfaces and the elastic deformation of said mounting flanges and said rim base edge portion relative to the substantially perpendicular plane of said radially directed wheel felloe surfaces.

* * * * *